Fig.1

Inventors
William P. Crossen
Jerome C. Howard
Herman A. Imhof
By their Attorney

Fig.2

# United States Patent Office 3,102,285
Patented Sept. 3, 1963

3,102,285
INSOLE MOLDING MACHINES
William P. Crossen, Magnolia, Jerome C. Howard, Danvers, and Herman A. Imhof, South Hamilton, Mass., assignors to United Shoe Machinery Corporation, Flemington, N.J., a corporation of New Jersey
Filed Nov. 17, 1961, Ser. No. 153,013
12 Claims. (Cl. 12—21)

This invention relates to machines for shaping shoe parts or other articles, and more particularly to a sole molding machine of the type disclosed in a pending application Serial No. 26,572, filed May 3, 1960, in the names of Jerome C. Howard et al., for "Sole Molding Machines," now Patent No. 3,010,127, granted November 28, 1961.

In the machine of the cited application, which is a two-station machine for molding a pair of soles at a time, there is provided at each station a pair of cooperating mold members, one of which is movable relative to the other, the two movable mold members being mounted on a single carrier to which operative movement is imparted in each machine cycle by a pressure fluid operated piston. The soles to be molded are stacked in a magazine at each station, wherein a pair of relatively movable end gages are operated in timed relation with the mold carrier to engage the opposite ends of each successive lowermost sole in the magazine and to gage it lengthwise in such manner that when it is later transported by other means, also movable in timed relation with the other carrier, and deposited on the mold member supported on the carrier, its ball line, along which the "break" occurs in the molding operation, will substantially coincide with the corresponding high portion of the mold member, irrespective of differences in sole sizes.

The arrangement provided in that machine operates satisfactorily on most types of flat soles. However, in operating upon certain types of soles, for example, those which are provided with a binding tape around their edges or those, usually of the laminated type, in which the forepart is of lesser thickness than the shank and heel portions, difficulty is sometimes experienced in effecting the proper separation and removal of the individual soles, with resulting adverse effects upon the operation of the end gages and the transferring mechanism.

It is accordingly one object of the present invention to provide improved means for separating each successive lowermost sole from the rest of the soles stacked at each station of the machine and for moving it into a position in which it is first gaged by the end gages and thereafter transported in the gaged position and deposited on the mold members supported on the carrier. To this end, and in accordance with a feature of the invention, there is provided at each operating station of the machine a curved arm having a shoulder piece adapted to engage each successive lowermost sole and to move it into position to be gaged by the above-mentioned end gages. Each arm is operatively connected to the mold carrier in such manner that during the movement of the carrier to locate the mold members thereon in molding position the arm is rotated in a direction such that the forward end of the shoulder piece engages an edge face of the lowermost sole in the magazine while its rear end engages the under surface of the next succeeding lowermost sole and exerts a camming action on this sole, whereby the stacked soles are raised slightly in the magazine to free the sole engaged by the forward end of the shoulder piece for movement into position to be gaged and transferred in the manner above described.

It is a further object of the invention to provide improved means for removing each sole from between the molds at the end of a molding operation and for stacking them until they are subsequently removed by the operator. As herein illustrated, this means comprises two pairs of gripper members mounted on a carriage operatively connected to the mold carrier and movable in timed relation therewith alternately to move each pair of gripper members in one direction to grip one end of a sole while the sole is being molded at each station, and in the opposite direction to remove the sole after the separation of the mold members. As the carriage nears the end of its return stroke, the two pairs of gripper members are actuated to release the soles, which are received and stacked in a magazine provided at each station.

The above and other features of the invention will be more clearly understood from the following detailed description, with reference to the accompanying drawings, and particularly pointed out in the claims.

The machine comprises a frame 20 (FIG. 1), the lower part of which houses a fluid pressure operating mechanism comprising a pump 22 constantly driven by a motor 24 to supply pressure fluid, under the control of a solenoid-operated valve (not shown), to a cylinder 26 bolted to the lower end of a casting 28 fixed to the machine frame. A piston 30 movable in the cylinder supports on its upper end a platform or carrier 32 for a pair of lower, or male mold members 34, of a configuration substantially corresponding to the shape to be imparted to the soles. The mold members 34 cooperate with complementally shaped upper, or female mold members 36 mounted on holders 37 secured to a crosshead 38, to mold a pair of soles in each operating cycle of the machine. Like the machine of the prior application, the present machine operates in such manner that at each downward stroke of the piston 30, after the completion of a molding operation, the fluid pressure system is automatically rendered effective to cause the piston to repeat its operative upward stroke to effect the molding of a succeeding pair of soles which will in the meantime have been located on the lower mold members 34 by means to be described hereinafter.

Figure 1:
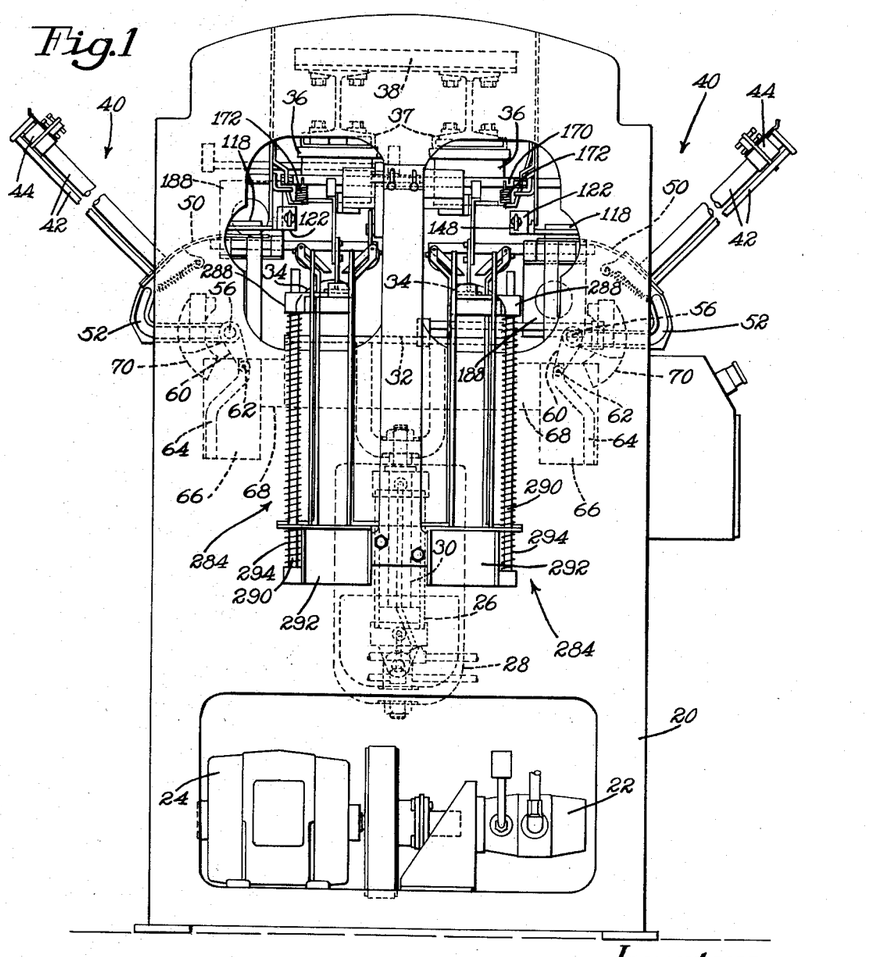
FIG. 1 is a view in front elevation of a twin sole molding machine embodying the invention.
Figure 2:
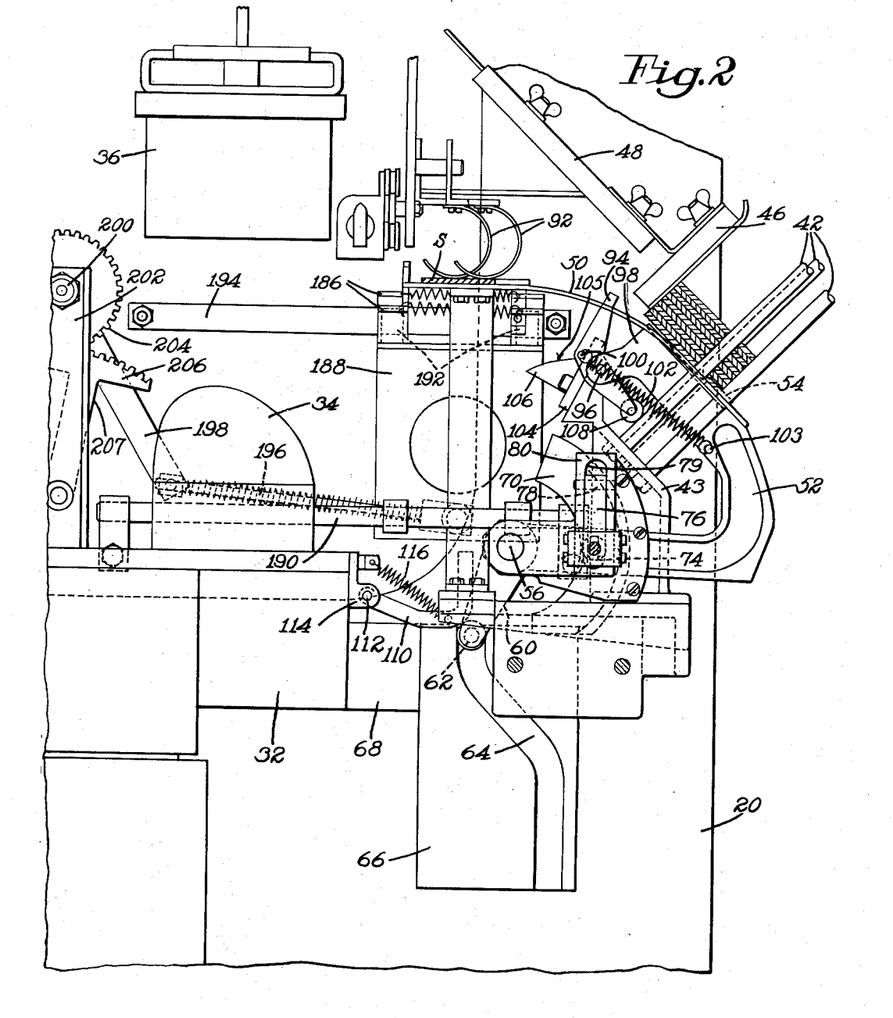
FIG. 2 is a view in front elevation, on an enlarged scale, of one of the two stations of the machine shown in FIG. 1, this view showing the sole separating and feeding mechanism provided by the invention in its starting or rest position after having separated a sole from a stack and moved it into position to be gaged lengthwise.
Figure 3:
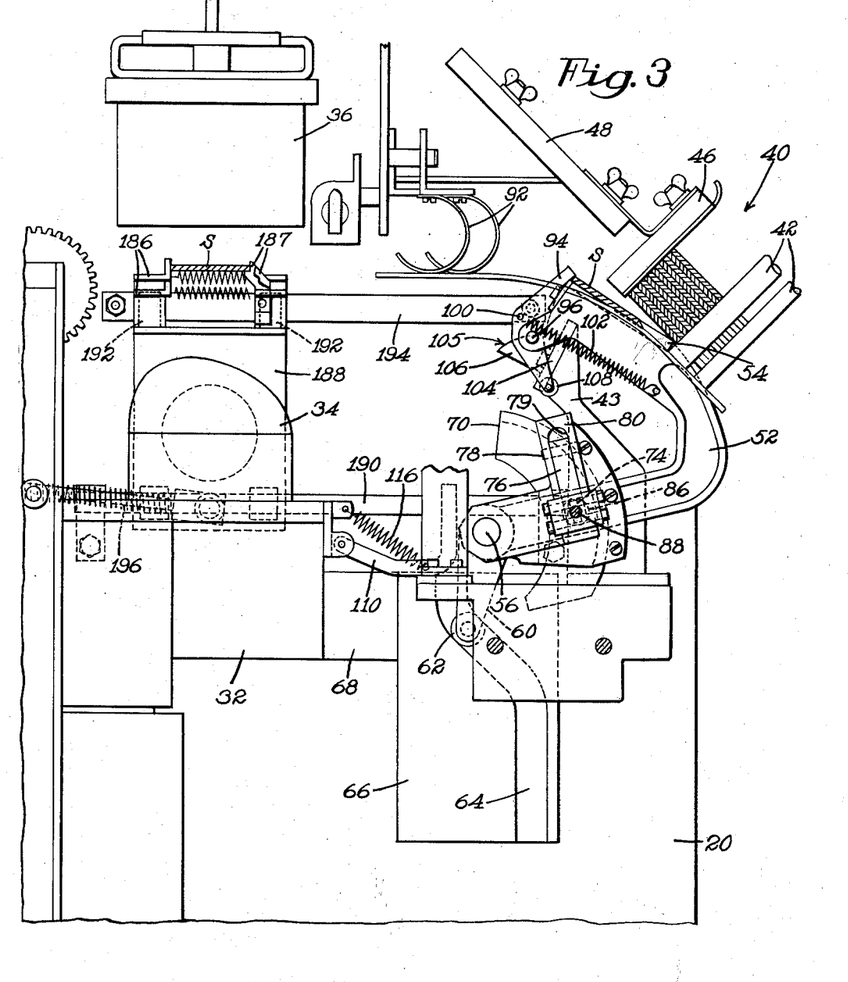
FIG. 3 is a view similar to FIG. 2, showing the sole separating and feeding mechanism in an intermediate position and also showing the transfer means in position to deposit a previously gaged sole on one of the mold members.
Figures 4, 5, 6:
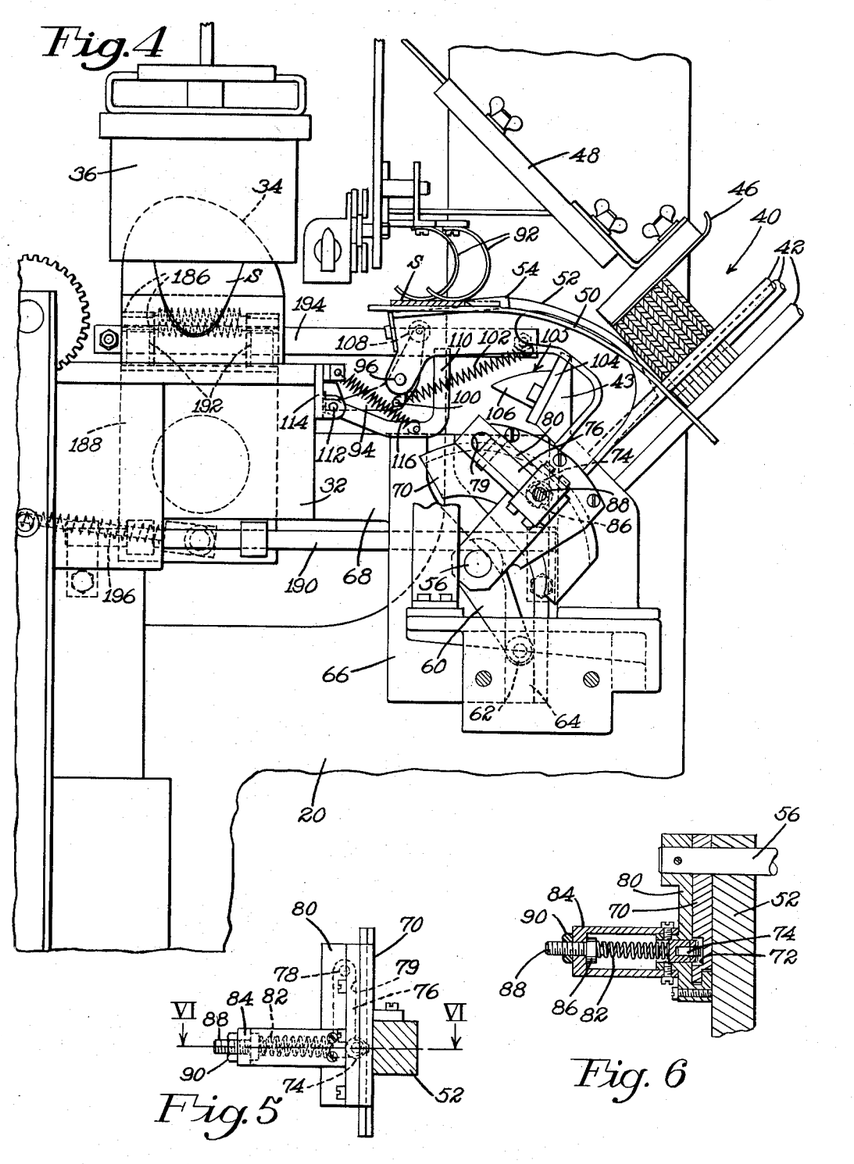
FIG. 4 is another view similar to FIG. 2, showing the sole separating and feeding mechanism at the end of its operative movement to place a sole in position to be gaged, and a previously gaged sole undergoing molding action by the mold members.
FIG. 5 is a detail view of a latching device normally connecting the sole separating and feeding means to the mold carrier and operated under certain conditions to disconnect it therefrom to prevent damage to the mechanism.
FIG. 6 is a sectional view taken along the line VI—VI of FIG. 5.

Referring to FIGS. 2, 3 and 4, the soles to be molded are stacked in a magazine provided at each side of the machine and identified generally by the reference numeral 40, each magazine being formed by a plurality of angularly disposed bars or rods 42 secured at their lower ends in an upstanding bracket 43, a block 44 (FIG. 1) slidable upon the rods and adapted to engage the uppermost one of a stack of soles S, and a plate 46 (FIGS. 2, 3 and 4) attached to the lower end of an inclined bracket 48 fixed to the machine frame. The lowermost one of the soles stacked in each magazine rests on a rearwardly and downwardly inclined portion of a platform or table 50 formed by a pair of curved plates fixed to the machine frame and spaced laterally from each other to provide clearance for an arm 52 substantially in the shape of an inverted C. This arm has secured to the top of its forward end portion a shoulder piece 54 the forward end of which is adapted to engage an edge face of the lowermost sole in the magazine and to move the sole along the table forward, or inward, of the machine when the arm 52 is moved, in a manner to be described presently, in a counterclockwise direction, as viewed in FIGS. 2, 3 and 4. The shoulder piece 54 is preferably detachably secured to the arm, so as to permit use of shoulder pieces of different thicknesses corresponding to the thicknesses of soles stacked in the magazines.

Each arm 52 is loosely mounted on a shaft 56 (FIGS. 1, 2, 3 and 4) rotatable in the machine frame. Near the outer end of the shaft 56 is pinned the upper end of an arm 60, the lower end of which carries a roll 62 engaging in a cam groove 64 provided in a plate 66 attached to a bracket 68 which is secured to the mold carrier 32. To the arm 52 is fastened an arcuate plate 70 having a recess 72 (FIG. 6) engaged by a roll 74 carried by a detent 76 (FIGS. 2, 3, 4 and 5) pivoted on a pin 78 for swinging movement in a slot 79 provided in an arm 80 pinned to the shaft 56 and having a tongue-and-groove connection with the arcuate plate 70. The detent 76 is normally urged in a direction to maintain the roll 74 within the recess 72 by a compression spring 82 (FIGS. 5 and 6) confined within a holder 84 between the lower end of the detent and a collar 86 on the inner end of a screw 88 extending through the holder 84 and having a nut 90 threaded on its outer end.

The arrangement is such that, as the mold carrier 32 is moved upward from the position shown in FIGS. 1 and 2 by the piston 30 to bring the lower molds 34 into cooperating relation with the upper molds 36 to effect a molding operation, the action of the cam groove 64 on the roll 62 carried by the arm 60 which is pinned to the shaft 56 rocks the shaft counterclockwise, as seen in FIGS. 3 and 4, whereby the arcuate plate 70 and the arm 52 are moved as a unit with the arm 80 in the same direction. As the arm 52 moves toward the soles stacked in the magazine 40 at each side of the machine, the forward end of the shoulder piece 54 engages an edge face of the lowermost sole, while its rear end engages the under surface of the next succeeding sole in the magazine (see FIG. 3) and, by a camming action, raises the stacked soles slightly to separate them from the sole engaged by the forward end of the shoulder piece. As the arm continues to turn inward during the continued upward movement of the mold carrier, the separated sole is moved by the shoulder piece 54 along the table 50 to the position shown in FIG. 4, where it slips under a pair of resilient clamp members 92 attached to the machine frame. If for any reason, such as failure to separate the lowermost sole in either of the magazines, the arm 52 should encounter resistance to its operative movement while the mold carrier 32 continues its upward movement, the roll 74 carried by the detent 76 will be cammed out of the recess 72 in the arcuate plate 70, whereby the arm 52 and the arcuate plate will be disconnected from the arm 80, which is pinned to the shaft 56, and turn idly on the shaft in reverse direction under the influence of gravity to their initial positions, thereby preventing possible damage to the machine.

The opposite edge face of the sole is engaged by a finger or edge gage 94 (FIGS. 2, 3 and 4) pivoted by a pin 96 on an extension 98 of the arm 52. The edge gage 94 carries a pin 100 to which is attached one end of a spring 102, the other end of which is attached to a pin 103 on the arm 52. In the starting position of the machine the edge gage is held in the position shown in FIG. 2, against the tension of the spring 102 tending to swing it in a clockwise direction, by engagement of the pin 100 in the angle between an abutment face 104 and a cam surface 105 of a member 106 fixed to the bracket 43. When the arm 52 begins to move counterclockwise, from its position shown in FIG. 2 to that shown in FIG. 3, in response to upward movement of the mold carrier 32, the pin 100 is disengaged from the member 106, releasing the edge gage 94 to the action of the spring 102 which swings it about its pivot 96 in a clockwise direction into engagement with the sole, to control the sole against widthwise displacement on the table 50 while it is gaged lengthwise by means shortly to be described. The edge gage 94 carries a roll 108 which, as the mold carrier 32 nears the limit of its upward movement, is yieldingly engaged by a finger 110 (FIGS. 3 and 4) pivoted at 112 on a bracket 114 secured to the carrier 32, the finger 110 having attached to it one end of a spring 116, the other end of which is attached to a lug on the bracket 114. Engagement of the finger 110 with the roll 108 causes the edge gage 94 to swing in a counterclockwise direction about its pivot 96 toward the position shown in FIG. 4, its movement being completed by the spring 102, thereby releasing the sole to enable it to be removed and transferred to the molding station by means also to be described shortly.

Figure 7:
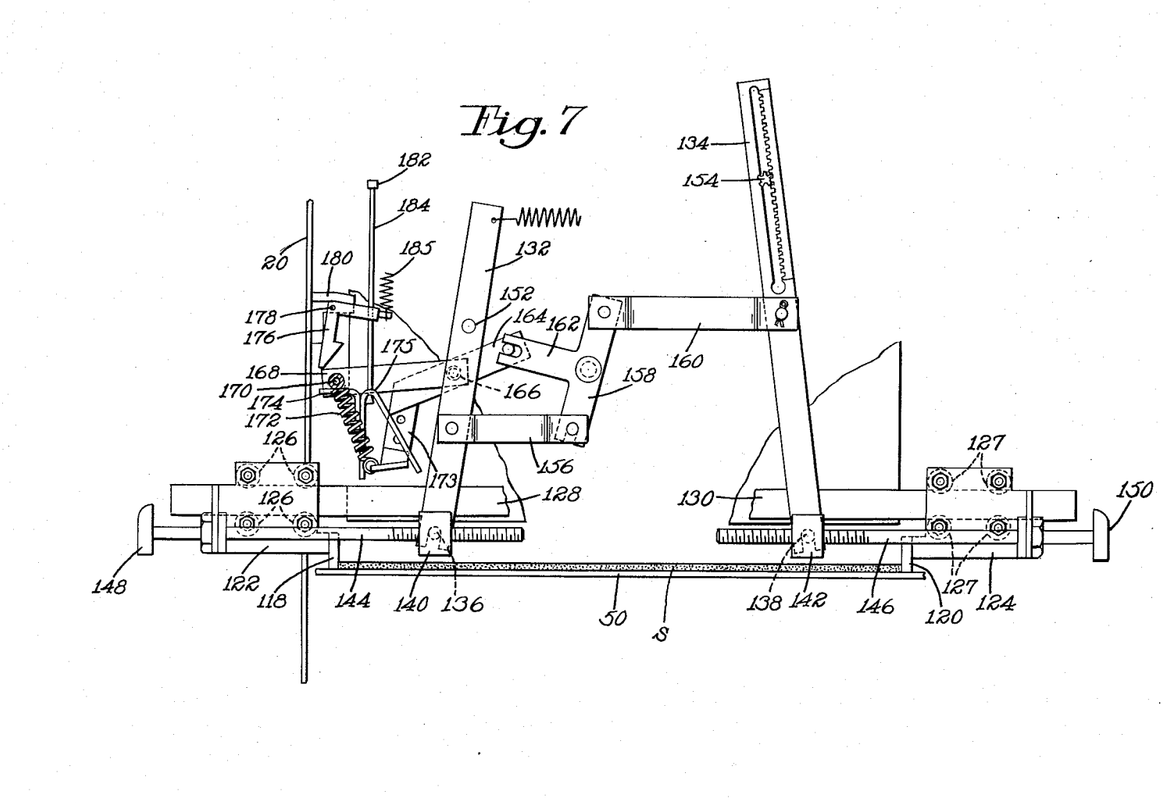
FIG. 7 is a view in left hand side elevation of the sole gaging mechanism.

The lowermost sole successively separated from the soles stacked in each magazine and advanced by the arm 52 as above described is engaged at its toe and heel ends by a pair of gage members 118, 120 (FIG. 7), which gage the sole lengthwise with relation to the male mold member 34 in a manner substantially similar to that described in the previously mentioned application, to which reference may be had for a more detailed explanation. The gage members 118, 120 are secured, respectively, to slides 122, 124 guided by rolls 126, 127 for relative movement transversely of the machine on rails 128, 130 fixed to a portion of the machine frame at each side of the machine. The slides 122, 124 at each station are interconnected for simultaneous relative movements to move the gage members 118, 120 toward and away from the sole positioned on the table 50 as previously explained by means comprising levers 132, 134 pivoted at their lower ends on pins 136, 138 extending from blocks 140, 142 mounted respectively on the inner threaded portions of rods 144, 146 extending through the slides 122, 124 and provided at their outer ends with knobs 148, 150 by which the rods may be turned to adjust the slides variably to adjust the relative starting positions of the gage members in accordance with the style characteristics of the last bottoms to which the molded soles are to be fitted in the manufacture of shoes. The levers 132, 134 swing respectively about pivots 152, 154, and are connected to each other for conjoint swinging movements by means comprising a link 156, a lever 158, and a link 160. An arm 162 of the lever 158 is pivotally connected to one arm of a lever 164 pivoted by a pin 166 on a wall of the machine frame. Also pivoted on the pin 166 is one end of an arm 168, the other end of which is secured to one end of a bar 170 extending across the front of the machine (see FIG. 1) and having secured to its opposite end an arm similar to the arm 168. Each end of the bar 170 is connected by a tension spring 172 to the lower end of a downwardly extending arm 173 of the lever 164. As the mold carrier 32 is raised by the upwardly moving piston 30 to effect a molding operation, an abutment plate 174 (FIG. 7) welded to a bracket 175 secured to the carrier engages the bar 170 and moves it upward, as the arms 168 to which it is secured turn clockwise about the pivots 166 and the levers 164 are moved by the springs 172 in the same direction, whereby, through the above-described connections, the levers 132, 134 are swung oppositely about their pivots 152, 154 to move the gage members 118, 120 toward the opposite ends of the sole S on the table 50. After engagement of the gage members with the sole, the expansion of the springs 172 permits the arms 168 to turn about the pivots 166 as the bar 170 is raised further during continued upward movement of the mold carrier.

As the bar 170 reaches the limit of its upward movement, it snaps into engagement with a latch member 176 (FIG. 7) pivoted at 178 on a bracket 180 fixed to the machine frame, whereby the bar is held in elevated position to maintain the gage members against the sole. Upon downward movement of the mold carrier, a head 182 on a rod 184 extending vertically from the bracket 175 engages the latch member 176 and causes it to swing about the pivot 178 in a clockwise direction, as viewed in FIG. 7, to release the bar 170, so that it may move downward and cause the levers 132, 134 to swing in the direction to move the gage members 118, 120 away from the sole. A spring 185 attached at one end to a pin projecting from the latch 176 and at its opposite end to the machine frame returns the latch to its normal position to be engaged by the bar 170 during a succeeding operating cycle.

When the gage members 118, 120 are moved out of engagement with a sole at each side of the machine in response to the downward stroke of the piston 30, transfer means substantially similar to the means employed in the prior machine are moved in one direction into engagement with the opposite edge faces of each sole and in the opposite direction in response to the upward stroke of the piston to transfer the soles and deposit them in their gaged position on each of the lower mold members 34 shortly before these members contact the upper mold members 36. The transfer means operating at each of the two molding stations of the machine comprise two pairs of fingers 186, 187 (FIG. 3) pivotally mounted on a carriage 188 (see also FIGS. 1, 2 and 4) which is slidable laterally of the machine upon a rod 190 supported on the machine frame, the carriage being guided in its movement by rolls 192 in engagement with a rail 194 fixed to the frame. One of the carriages 188 is connected by a rod 196 to one end of an arm 198, to the opposite end of which the other carriage is connected by a similar rod. The arm 198 is mounted at about midway its length on a shaft 200 journaled in a bracket 202 fixed to the machine frame. A gear 204 keyed to the shaft meshes with the teeth of a gear segment 206 formed on the upper end of an arm 207 which is rotated in opposite directions, in response to the movements of the mold carrier 32, by means described in the application referred to earlier, whereby the arm 198 is rotated in counterclockwise direction when the mold carrier is moved downward, to move the carriages 188 and the transfer fingers 186, 187 outwardly to engage a sole on the table 50 at each side of the machine, and in clockwise direction, during the upward movement of the mold carrier, to move the carriages and fingers inwardly to transport the soles and deposit them on the molds 34 before these molds are brought into cooperating relation with the molds 36.

As each lower mold 34 approaches the corresponding upper mold 36, the heel end portion of the sole deposited thereon by the transfer fingers is engaged by spring-pressed plungers 208, 209 (FIG. 9) provided in the heel end portions of the molds, to maintain the sole in the gaged position after the transfer fingers are caused to release it, by means described in the prior application, for the application of the final molding pressure.

At about the moment when the heel end of a sole on each lower mold is gripped by the plungers 208, 209, its toe end is grasped by a pair of grippers 210, 212 (FIGS. 8, 9 and 10) which are operated in timed relation with the upward and downward movements of the mold carrier, alternately to grasp each sole before the application of the molding pressure and to remove the molded sole upon completion of the molding operation and transfer it to a magazine provided at each operating station for stacking the molded soles until they are removed by the operator.

Figure 8:
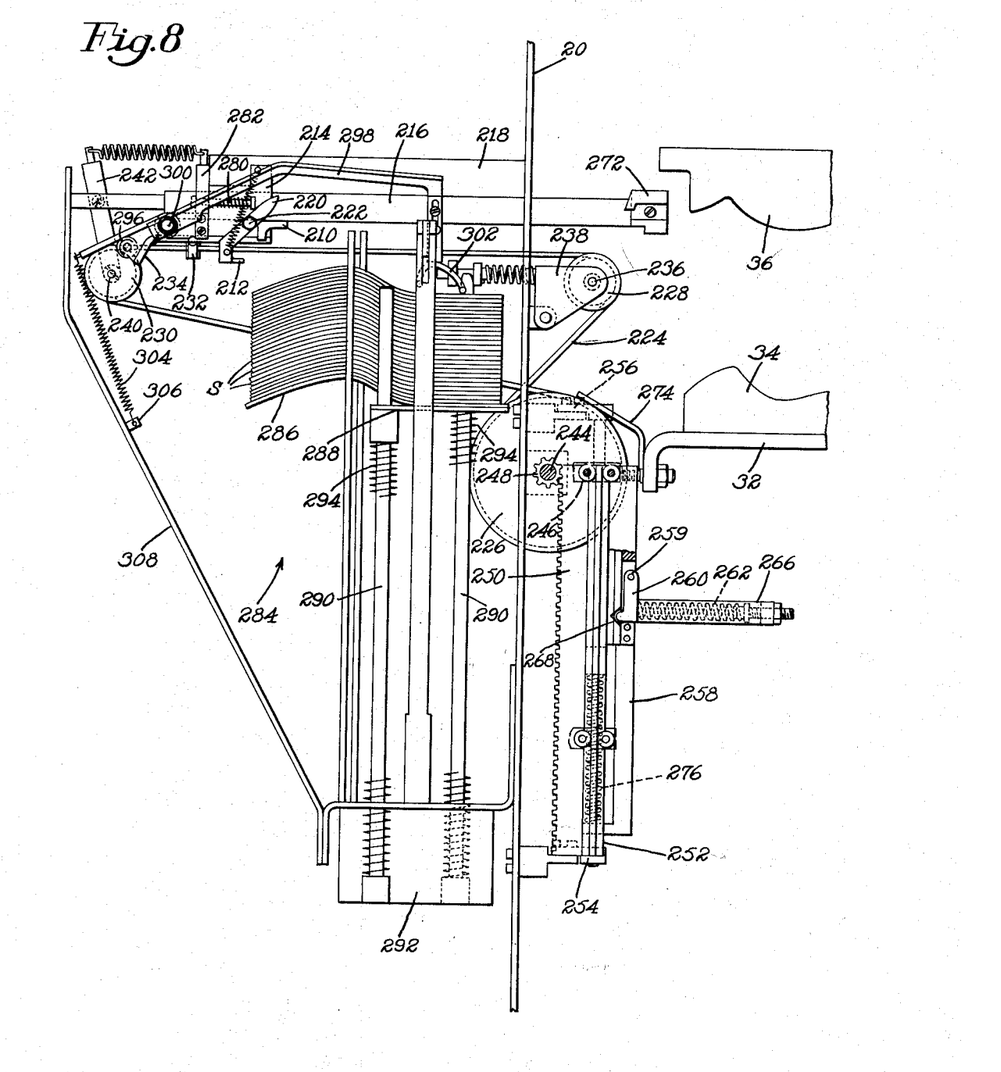
FIG. 8 is a view in side elevation of the sole removing and stacking mechanism provided by thte invention in its starting or rest position.
Figure 9:
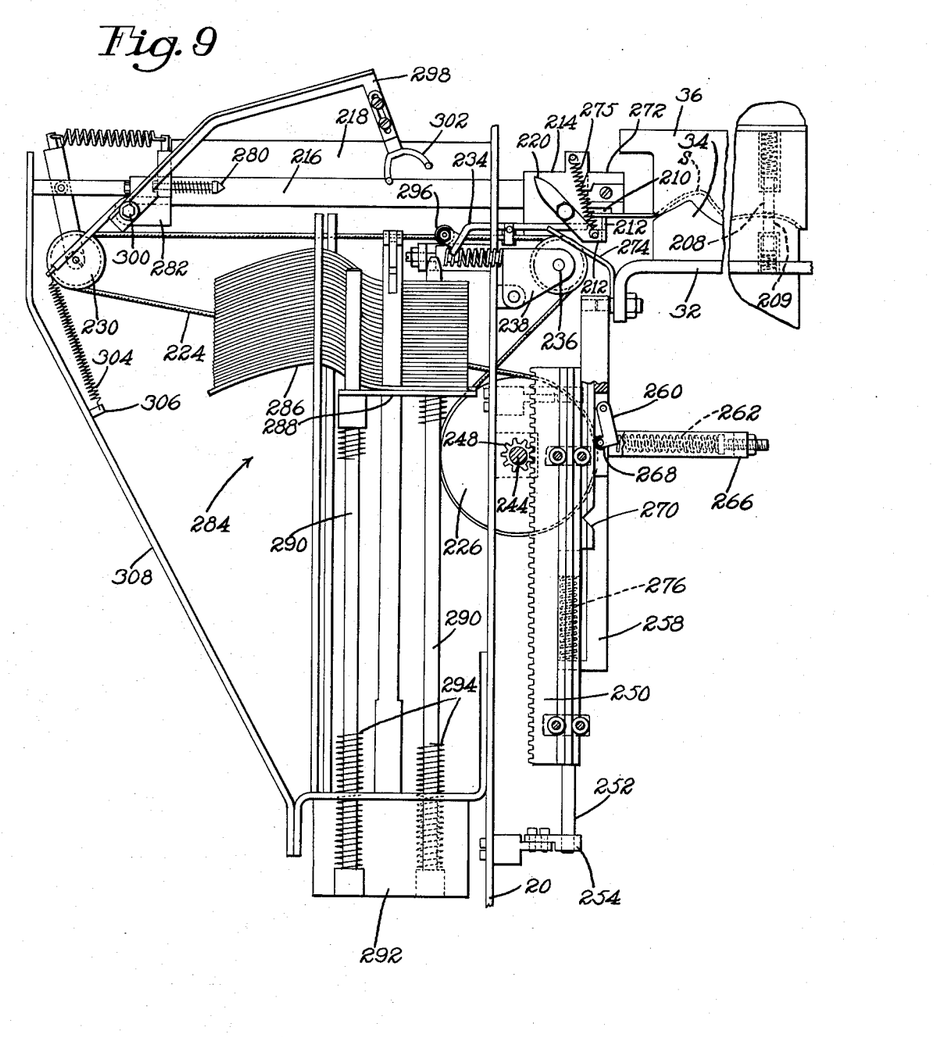
FIG. 9 is a view similar to FIG. 8 of the sole removing and stacking mechanism in an intermediate position, with the grippers closed on a sole undergoing pressure between the mold members.
Figure 10:
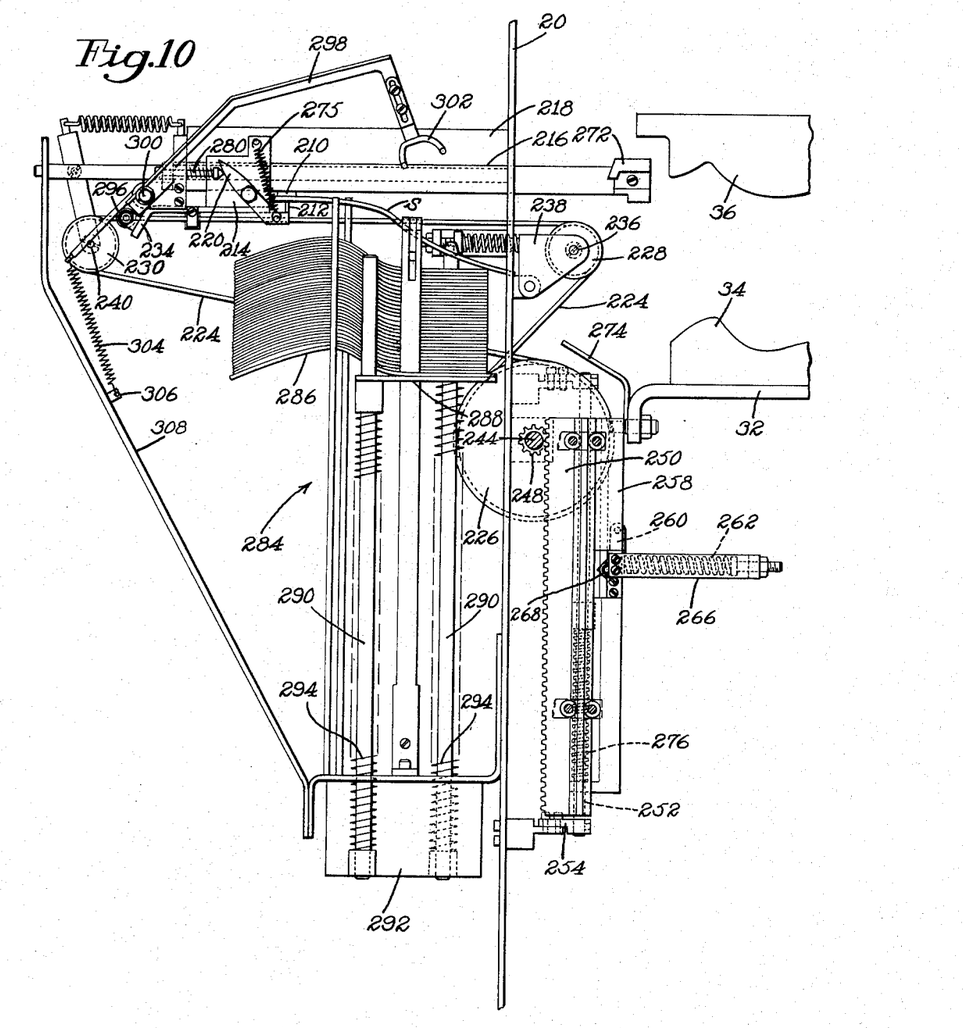
FIG. 10 is another view similar to FIG. 8 of the sole removing and stacking mechanism in its final position after the grippers have released a molded sole to allow it to be stacked.

The two pairs of grippers 210, 212 are mounted on a single carriage 214 which is movable on a rail 216 fastened to a bracket 218 fixed to the frame 20 at the front of the machine. The upper gripper 210 is fixed to the forward end of the carriage 214, while the lower gripper 212 constitutes one arm of a lever 220 pivoted at 222 on the carriage. The carriage 214 is reciprocated in response to the upward and downward movements of the mold carrier 32 to move the two pairs of grippers inwardly of the machine to engage the soles deposited on the lower mold members 34, and outwardly to remove the molded soles in the following manner: A cable 224 is crossed over a pulley 226 and passes around pulleys 228 and 230, the upper run of the cable also passing through a pair of blocks 232 which are fastened to each other and to a rearwardly extending arm 234 of the carriage 214. The pulley 228 is rotatably mounted on a stud 236 carried by a bracket 238 pivoted on the machine frame. The pulley 230 is rotatably mounted on a stud 240 carried by an arm 242 pivoted on a rearward extension of the bracket 218. The pulley 226 is keyed to one end of a shaft 244 journaled in a bracket 246 secured to the frame. A pinion 248 on the opposite end of the shaft 244 meshes with the teeth of a rack bar 250 mounted for vertical sliding movement on a rod 252 supported at its opposite ends in brackets 254, 256 fixed to the frame. The rack bar 250 has a tongue-and-groove connection with a member 258 which is secured at its upper end to the mold carrier 32 and to which is pivoted at 259 a detent 260. A spring 262 mounted in a holder 266 fixed to the member 258 normally biases the detent in a direction to maintain a roll 268 on the lower end of the detent in engagement with a notch 270 provided in the rack bar 250.

The arrangement is such that, when the mold carrier is moved up during the upward movement of the piston 30, the member 258 and the rack bar 250 move upward as a unit and, by rotating the pinion 248 in a counterclockwise direction, with reference to FIGS. 8, 9 and 10, cause the pulley 226 to be rotated in the same direction and the pulleys 228, 230 to be rotated clockwise. As a result, the cable 224 pulls the carriage 214 inwardly of the machine, or toward the right, as shown in FIG. 9, to move the grippers 210, 212 into position to engage the toe end of a sole S supported on each lower mold 34, until the carriage is stopped by engagement with an abutment member 272 fixed to the rail 216. Thereafter, as the member 258 continues to move upward with the mold carrier, while the rack bar 250 is held against movement by the engagement of the carriage 214 with the abutment member 272, the roll 268 on the detent 260 is cammed out of the notch 270, the spring 262 yielding to permit the detent to swing in a counterclockwise direction. The member 258 then continues to move upward with the mold carrier 32 until an arm 274 fixed to the carrier engages the gripper 212 and causes it to swing about the pivot 222 in a counterclockwise direction, against the tension of a spring 275 connecting it to the carriage 214, to the position shown in FIG. 9, to engage the under surface of the sole on the mold member 34, the spring 275 moving past dead center to maintain the gripper in engagement with the sole. As the member 258 moves upward, a spring 276 mounted on the rod 252 is compressed, the force of the spring being such that the rack bar 250 is maintained in the position in which the gripper members 210, 212 are in gripping engagement with the sole until, during the downward movement of the member 258 at the completion of a molding operation, the roll 268 reenters the notch 270, after which the rack bar and the member 258 move downward together to their starting positions. This lost motion arrangement in the connection between the member 258 and the rack bar 250 prevents premature retractive movement of the carriage 214, so that the grippers will not be retracted to remove a sole from between the mold members until the mold carrier has moved down a sufficient distance to separate the lower molds from the upper molds.

As the rack bar 250 moves downward, after the roll 268 has been reengaged in the notch 270, and the pinion 248 is rotated clockwise, as seen in FIG. 10, the pulley 226 is rotated in the same direction, while the pulleys 228, 230 are rotated counterclockwise, as a result of which the cable 224 pulls the carriage 214 rearward with the sole held between the grippers 210 and 212. As the carriage is thus moved rearward, or to the left of FIG. 10, the upper arm of the lever 220 of which the gripper 212 forms the lower arm is engaged by a spring-pressed plunger 280 supported in a bracket 282 which is fixed to the bracket 218, and is caused to swing in a clockwise direction, to the position shown in FIG. 8, to release the sole, so as to permit it to be deposited in a magazine provided at the front of the machine, at each operating station, in which the finished soles are stacked, as shown in FIG. 8, until a sufficient number of soles, usually corresponding to a case lot, have accumulated and are removed by the operator.

Each magazine in which the molded soles are stacked, identified generally by the reference character 284 (FIGS. 1, 8, 9 and 10), comprises a sole-shaped plate 286 which supports the first, or lowermost of the soles stacked in the magazine. The plate 286 is formed on the upper end of a carrier 288 which is movable heightwise on a pair of rods 290 mounted at their lower ends in a bracket 292 and surrounded by springs 294.

As the carriage 214 reaches the limit of its retractive movement and the sole is released by the grippers 210, 212, a roll 296 on the rear end of the arm 234 engages the rear end of an arm 298 pinned to a shaft 300 journaled in the bracket 282 and rocks the arm with the shaft in a clockwise direction to cause a claw 302 at the forward, or right-hand end of the arm 298 to engage the upper surface of each successive sole and depress the stacked soles, compressing the springs 294 which, when the arm 298 is moved out of its operative position, react with a force proportional to the increasing weight of the pile of successively stacked soles, in a manner such that the uppermost sole in each magazine will be located at a substantially constant level. When the roll 296 is disengaged from the rear end of the arm 298 in the forward movement of the carriage 214 at the beginning of a succeeding operating cycle, the arm is caused to move out of engagement with the uppermost one of the stacked soles and returned to its initial position by a spring 304 attached at one end to the arm and at its opposite end to a lug 306 projecting from a bracket 308 fixed to the machine frame.

Having thus described our invention, what we claim as new and desire to secure by Letters Patent of the United States is:

1. In a machine for molding work pieces, such as shoe soles, a pair of mold members, a carrier mounting one of the mold members and operated to move said member toward and away from the other mold member, a magazine for a plurality of stacked soles, end gages between the magazine and the mold members and movable in response to movement of the mold carrier in one direction to engage the opposite ends of a sole and gage it lengthwise with relation to the mold member on the carrier, and means responsive to movement of the carrier in said one direction to separate a sole from the magazine and to move it into position to be engaged by said end gages.

2. In a machine for molding work pieces, such as shoe soles, a pair of molds one of which is movable relative to the other, a carrier mounting the movable mold and operated to move the mold thereon toward and away from the fixed mold, a magazine for a plurality of stacked soles, end gages between the magazine and the mold members and movable in response to movement of the mold carrier in one direction to engage the opposite ends of a sole and to position it lengthwise with relation to the movable mold, and means connected to said mold carrier and actuated in response to movement of the carrier in said one direction to separate a sole from the magazine and move it into position to be engaged by said end gages.

3. In a machine for molding work pieces, such as shoe soles, a pair of mold members, a carrier mounting one of said mold members and movable to move the mold member thereon toward and away from the other mold member, a magazine for a plurality of stacked soles, end gages between the magazine and the mold members and movable in response to movement of the mold carrier in one direction to engage the opposite ends of a sole and to position it lengthwise with relation to the mold member on the carrier, a table engaged by the lowermost one of the soles stacked in the magazine, an arm having a shoulder piece adapted to engage an edge face of each sole successively engaging the table and to separate it from the remaining soles in the magazine, means operatively connecting said arm to the mold carrier whereby the arm is moved in response to movement of the mold carrier into operative position to cause the shoulder piece to engage the sole and move it into register with the end gages, and a member actuated in response to movement of the arm to engage the opposite edge face of the sole to control the sole against widthwise displacement while it is being gaged lengthwise by said end gages.

4. In a machine for molding work pieces, such as shoe soles, a movable and a fixed mold member, a carrier mounting the movable mold member, power means for imparting operative movement to the carrier, a magazine for a plurality of stacked soles, end gages movable in response to movement of the mold carrier into operative position to engage the opposite ends of a sole and to position it lengthwise with relation to the movable mold member, a table engaged by the lowermost one of the soles stacked in the magazine, an arm having a shoulder piece adapted to engage an edge face of the lowermost sole and to separate it from the remaining soles in the magazine, means operatively connecting said arm to the mold carrier whereby the arm is moved in response to movement of the mold carrier into operative position to cause the shoulder piece to engage an edge face of the lowermost sole and to move the sole along said table into register with the end gages, an edge gage actuated in response to movement of the arm to engage the opposite edge face of the sole to control the sole against widthwise displacement while it is being gaged by said end gages, means movable in response to movement of the mold carrier in one direction to engage the sole after it has been gaged by the end gages and in the opposite direction to transfer it to the molding station, and means on the mold carrier to cause said edge gage to release the sole in advance of its engagement by said transfer means.

5. In a machine for molding work pieces, such as shoe soles, a movable and a fixed mold member, a carrier mounting the movable mold member, power means for imparting operative movement to the carrier, a magazine for a plurality of stacked soles, end gages movable in response to movement of the mold carrier into operative position to engage the opposite ends of a sole and to position it lengthwise with relation to the movable mold member, a table engaged by the lowermost one of the soles stacked in the magazine, an arm having a shoulder piece adapted to engage an edge face of the lowermost sole and to separate it from the remaining soles in the magazine, means operatively connecting said arm to the mold carrier whereby the arm is moved in response to movement of the mold carrier into operative position to cause the shoulder piece to engage an edge face of the lowermost sole and to move the sole along said table into register with the end gages, said means including mechanism permitting the arm to be disconnected from the mold carrier in the event of obstruction to the movement of the arm so as to enable the carrier to complete its operative movement without damage to the machine.

6. In a machine for molding work pieces, such as shoe soles, a movable and a fixed mold member, a carrier mounting the movable mold member, power means for imparting operative movement to the carrier, a magazine for a plurality of stacked soles, end gages movable in response to movement of the mold carrier in one direction to engage the opposite ends of a sole and to position it lengthwise with relation to the movable mold member, means actuated in response to movement of the mold carrier in one direction to engage the sole after it has been gaged by the end gages and in the opposite direction to transfer the sole in the gaged position and locate it on the movable mold member, a magazine for receiving the molded soles, and means also actuated in response to the movements of the mold carrier first to grip the sole on said mold member and thereafter to remove the molded sole and transport it to said last named magazine.

7. In a machine for molding work pieces, such as shoe soles, a movable and a fixed mold member, a carrier mounting the movable mold member, power means for imparting operative movement to the carrier, a magazine for a plurality of stacked soles to be molded, end gages movable in response to movement of the mold carrier into operative position to engage the opposite ends of a sole and to position it lengthwise with relation to the movable mold member, means actuated in response to movement of the mold carrier in one direction to engage the sole after it has been gaged by the end gages and in the opposite direction to transfer the sole in the gaged position and locate it on the movable mold member, a second magazine for receiving the molded soles, means also actuated in response to the movements of the mold carrier to grip the sole while it is held between the mold members and to transport the molded sole to said second magazine after the separation of the mold members, and means for stacking the molded soles successively transported to said second magazine.

8. In a machine for molding work pieces, such as shoe soles, a movable and a fixed mold member, a carrier mounting the movable mold member, power means for imparting operative movement to the carrier, a first magazine for a plurality of stacked soles to be molded, end gages movable in response to movement of the mold carrier into operative position to engage the opposite ends of a sole and to position it lengthwise with relation to the movable mold member, means actuated in response to movement of the mold carrier in one direction to engage the sole after it has been gaged by the end gages and in the opposite direction to transfer the sole in the gaged position and locate it on the movable mold member, a second magazine for receiving the molded soles, grippers, means mounting said grippers and movable in one direction to move the grippers into position to grip the sole after the same has been located on the movable mold member and in the opposite direction to move the grippers with the molded sole away from the mold member and toward said second magazine, means to cause the grippers to grip the sole prior to commencement of the molding operation, and means to cause the grippers to release the molded sole after its removal from said mold member.

9. In a machine for molding work pieces, such as shoe soles, a movable and a fixed mold member, a carrier mounting the movable mold member, power means for imparting operative movement to the carrier, a first magazine for a plurality of soles to be molded, end gages movable in response to movement of the mold carrier into operative position to engage the opposite ends of a sole and to position it lengthwise with relation to the movable mold member, means actuated in response to movement of the mold carrier in one direction to engage the sole after it has been gaged by the end gages and in the opposite direction to transfer the sole in the gaged position and locate it on the movable mold member in position to be molded, a second magazine for receiving the molded soles, grippers, means mounting said grippers and movable in response to the movements of the mold carrier alternately to locate the grippers in position to grip the sole located on the lower mold by the transfer means and to move the grippers with the molded sole away from said mold member after the separation of the mold members, means to cause the grippers to grip the sole prior to the closing of the mold members to apply molding pressure, and means to cause the grippers to release the sole after its removal to permit it to be stacked in said second magazine.

10. In a machine for molding work pieces, such as shoe soles, a movable and a fixed mold member, a carrier mounting the movable mold member, power means for imparting operative movement to the carrier, a magazine for a plurality of stacked soles, end gages movable in response to movement of the mold carrier into operative position to engage the opposite ends of a sole and to position it lengthwise with relation to the movable mold member, means actuated in response to movement of the mold carrier in one direction to engage the sole after it has been gaged by the end gages and in the opposite direction to transfer the sole in the gaged position and locate it on the movable mold member in position to be molded, a magazine for receiving the molded soles, a fixed gripper and a movable gripper, a carriage mounting both of said grippers, means operatively connecting said carriage to the mold carrier and operated in response to movement of the carrier in one direction to move the carriage and the grippers toward the movable mold member and in the opposite direction to move the carriage and the grippers with the sole gripped between them away from said mold member, a stop member for stopping the gripper carriage in a determined position prior to completion of the movement of the mold carrier in said one direction, means connected to the mold carrier and acting on the movable gripper to move it into gripping engagement with the sole on the movable mold member, means in the connection between the mold carrier and the gripper carriage to hold the carriage against retractive movement until the mold carrier has been moved a determined distance to separate the mold members, and means acting on the movable gripper to release the sole at the end of the retractive movement of the gripper carriage.

11. In a machine for molding work pieces, such as shoe soles, a movable and a fixed mold member, a carrier mounting the movable mold member, power means for imparting operative movement to the carrier, a magazine for a plurality of stacked soles, end gages movable in response to movement of the mold carrier into operative position to engage the opposite ends of a sole and to position it lengthwise with relation to the movable mold member, means actuated in response to movement of the mold carrier in one direction to engage the sole after it has been gaged by the end gages and in the opposite direction to transfer the sole in the gaged position and locate it on the movable mold member in position to be molded, a magazine for receiving the molded soles, a fixed gripper and a movable gripper, a carriage mounting both of said grippers, means operatively connecting said gripper carriage to the mold carrier and operated in response to movement of the carrier in one direction to move the carriage and the grippers toward the movable mold member and in the opposite direction to move the carriage and the grippers with the sole gripped between them away from said mold member, a stop member for stopping the gripper carriage in a determined position prior to completion of the movement of the mold carrier in said one direction, means connected to the mold carrier and acting on the movable gripper to move it into gripping engagement with the sole on the movable mold member, means acting on the movable gripper to release the sole at the end of the retractive movement of the gripper carriage, and means actuated in response to said retractive movement of the gripper carriage to engage the sole after it is released by the grippers and to stack it in last named magazine.

12. A twin sole molding machine having at each station a magazine for a plurality of stacked soles to be molded, a fixed and a movable mold member at each station, a support for both fixed molds, a carrier for both movable molds operated to move the molds thereon toward and away from the fixed molds, end gages at each station operated in response to movement of the mold carrier in one direction to engage the opposite ends of each sole successively and to gage it lengthwise with relation to the movable mold, means at each station operatively connected to the mold carrier and actuated in response to movement of the carrier in said one direction to separate a sole from the remainder of the soles stacked in each magazine and move it into register with said end gages, edge gages at each station operatively connected to the mold carrier and actuated in timed relation to the movement of the carrier alternately to engage the sole after it has been gaged by the end gages and to transfer it in the gaged position to the mold on the carrier, a pair of grippers at each station for gripping each sole located by the edge gages on the movable mold, a carriage mounting both pairs of grippers, a driving connection between the gripper carriage and the mold carrier to move the carriage and the grippers in timed relation to the movements of the mold carrier alternately toward the movable molds to grip the soles thereon prior to commencement of a molding operation and away therefrom to remove the molded soles at the end of the molding operation, means to cause the grippers to release the soles at the end of the retractive movement of the gripper carriage, a magazine at each station for receiving the molded soles, and means actuated in response to the retractive movement of the gripper carriage to engage the soles released by the grippers and to stack them in last named magazines.

References Cited in the file of this patent
UNITED STATES PATENTS

| | | |
|---|---|---|
| 1,655,126 | Bazzoni | Jan. 3, 1928 |
| 2,048,595 | Brown | July 21, 1936 |
| 3,010,127 | Howard et al. | Nov. 28, 1961 |